US009557724B2

(12) United States Patent
Chu et al.

(10) Patent No.: US 9,557,724 B2
(45) Date of Patent: Jan. 31, 2017

(54) TECHNIQUE FOR CONVERTING A MODEL PREDICTIVE CONTROL (MPC) SYSTEM INTO AN EXPLICIT TWO-DEGREES OF FREEDOM (2DOF) CONTROL SYSTEM

(71) Applicant: HONEYWELL ASCa, Inc., Mississaugo (CA)

(72) Inventors: Danlei Chu, North Vancouver (CA); Michael Forbes, North Vancouver (CA); Johan U. Backstrom, North Vancouver (CA)

(73) Assignee: Honeywell Limited, Ontario (CA)

( * ) Notice: Subject to any disclaimer, the term of this patent is extended or adjusted under 35 U.S.C. 154(b) by 883 days.

(21) Appl. No.: 13/907,495

(22) Filed: May 31, 2013

(65) Prior Publication Data

US 2014/0358254 A1 Dec. 4, 2014

(51) Int. Cl.
G05B 13/02 (2006.01)
G05B 13/04 (2006.01)
G05B 11/42 (2006.01)

(52) U.S. Cl.
CPC ............ G05B 13/048 (2013.01); G05B 11/42 (2013.01)

(58) Field of Classification Search
None
See application file for complete search history.

(56) References Cited

U.S. PATENT DOCUMENTS

| 5,351,184 | A |   | 9/1994  | Lu et al.    |
|-----------|---|---|---------|--------------|
| 5,394,322 | A | * | 2/1995  | Hansen ................ G05B 13/045 700/32 |
| 5,561,599 | A |   | 10/1996 | Lu           |
| 5,572,420 | A |   | 11/1996 | Lu           |
| 5,574,638 | A |   | 11/1996 | Lu           |
| 5,758,047 | A |   | 5/1998  | Lu et al.    |
| 6,055,483 | A |   | 4/2000  | Lu           |

(Continued)

OTHER PUBLICATIONS

V. M. Alfaro, (Dept of Autom; University of de costarica); 47th IEEE Conference on Decision and Control; Date: Dec. 9-11, 2008; Title: Two-Degree-of-Freedom PI/PID Tning Approach for smooth Control on Cascade Control System).*

(Continued)

*Primary Examiner* — Robert Fennema
*Assistant Examiner* — Md N Mia (57) ABSTRACT

A method includes obtaining a reference tracking performance ratio and a disturbance rejection performance ratio associated with a model predictive control (MPC) controller. The method also includes filtering an output target signal for the controller using a first filter based on the reference tracking performance ratio. The method further includes filtering a feedback signal for the controller using a second filter based on the disturbance rejection performance ratio. The filters can provide two degrees of freedom for tuning reference tracking and disturbance rejection operations of the controller. The reference tracking operation of the controller and the disturbance rejection operation of the controller can be independently tunable. The reference tracking performance ratio can control how aggressively the controller responds to a change in the output target signal. The disturbance rejection performance ratio can control how aggressively the controller responds to a disturbance in the feedback signal.

20 Claims, 5 Drawing Sheets

(56) References Cited

U.S. PATENT DOCUMENTS 6,122,555 A    9/2000 Lu
2009/0198350 A1* 8/2009 Thiele .................. G05B 13/042
                                                          700/30

OTHER PUBLICATIONS

J.M. Maciejowski; "Predictive Control with Constraints"; Pearson Education Limited; Published 2002; 6 pages.

* cited by examiner

TECHNIQUE FOR CONVERTING A MODEL PREDICTIVE CONTROL (MPC) SYSTEM INTO AN EXPLICIT TWO-DEGREES OF FREEDOM (2DOF) CONTROL SYSTEM

TECHNICAL FIELD

This disclosure relates generally to industrial process control systems. More specifically, this disclosure relates to a technique for converting a model predictive control (MPC) system into an explicit two-degrees of freedom (2DOF) control system.

BACKGROUND

Model predictive control (MPC) techniques use one or more models to predict the future behavior of an industrial process. Control signals for adjusting the industrial process are then generated based on the predicted behavior. MPC techniques have become widely accepted in various industries, such as the oil and gas, pulp and paper, food processing, and chemical industries. One benefit of using MPC techniques is that a process' physical constraints can be explicitly incorporated into a controller's design, which is a challenging task for traditional control schemes like proportional-integral-derivative (PID), Dahlin, and linear-quadratic-Gaussian (LQG)/linear-quadratic regulator (LQR) techniques.

Unfortunately, MPC techniques usually formulate feedback control into a constrained optimization problem, and this is often a completely new concept for many end users. Also, the performance of an MPC controller often depends on the choice of weighting matrices used in the controller's objective functions. In many cases, the weighting matrices do not have any physical meaning to the end users. In addition, the selection of appropriate values in the weighting matrices is typically a non-trivial task, often requiring the end users to rely on MPC tuners or trial-and-error simulations.

As a result, configuring an MPC controller is often non-intuitive and requires a certain level of control knowledge to achieve success. These challenges can limit MPC acceptance in some industries or applications, such as papermaking machine direction (MD) and cross direction (CD) control. In general, it can be a challenge to educate end users to switch from traditional control schemes to MPC control schemes.

SUMMARY

This disclosure provides a technique for converting a model predictive control (MPC) system into an explicit two-degrees of freedom (2DOF) control system.

In a first embodiment, a method includes obtaining a reference tracking performance ratio and a disturbance rejection performance ratio associated with a model predictive control (MPC) controller. The method also includes filtering an output target signal for the MPC controller using a first filter based on the reference tracking performance ratio. The method further includes filtering a feedback signal for the MPC controller using a second filter based on the disturbance rejection performance ratio.

In a second embodiment, an apparatus includes at least one processing device configured to obtain a reference tracking performance ratio and a disturbance rejection performance ratio associated with an MPC controller. The at least one processing device is also configured to filter an output target signal for the MPC controller using a first filter based on the reference tracking performance ratio. The at least one processing device is further configured to filter a feedback signal for the MPC controller using a second filter based on the disturbance rejection performance ratio.

In a third embodiment, a non-transitory computer readable medium embodies a computer program. The computer program includes computer readable program code for filtering an output target signal for an MPC controller using a first filter based on a reference tracking performance ratio. The computer program also includes computer readable program code for filtering a feedback signal for the MPC controller using a second filter based on the disturbance rejection performance ratio.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 5A through 6B illustrate example effects of different performance ratios in a 2DOF control system according to this disclosure.

DETAILED DESCRIPTION

FIGS. 1 through 7, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

In general, this disclosure describes a technique for converting a model predictive control (MPC) system into an explicit two-degrees of freedom (2DOF) control system. For example, an MPC controller typically operates by adjusting one or more manipulated variables (MVs) to cause changes to one or more controlled variables (CVs). The manipulated variables are typically adjusted using actuators, and the controlled variables are typically measured using sensors (where the sensor measurements are used for feedback). The MPC controller typically attempts to keep each controlled variable at a target value or within a range of values.

To facilitate the use of MPC techniques, such as by end users who lack knowledge of or experience with MPC, the controller can support a technique for converting an MPC system into an explicit 2DOF control system. As described below, this is accomplished by inserting two types of filters, such as low-pass filters, into the MPC framework. One filter is defined by a reference tracking (RT) performance ratio, and the other filter is defined by a disturbance rejection (DR) performance ratio.

The RT performance ratio defines the ratio between the desired closed-loop reference tracking response time and the process open-loop response time, meaning it governs the generation of output reference trajectories in the MPC objective function. In other words, the RT performance ratio defines how aggressively a controller responds to changes in an output target. The DR performance ratio defines the ratio between the desired closed-loop disturbance rejecting response time and the process open-loop response time. In other words, the DR performance ratio defines how aggressively a controller rejects CV disturbances in its feedback loop. There can be one RT performance ratio and one DR performance ratio defined for each CV channel in an MPC controller.

Careful design of the RT and DR filters converts an MPC control system into an explicit 2DOF feedback control system. Conventional MPC systems can explicitly incorporate an industrial process' physical constraints into the controller's design. However, MPC systems are typically harder to tune, and it can be difficult for end users when switching from traditional control techniques to MPC control techniques. Moreover, in conventional MPC systems, it is typically very difficult to tune the reference tracking performance and the disturbance rejection performance independently of one other. This is because the tuning parameters used by conventional MPC systems affect both the reference tracking performance and the disturbance rejection performance.

The use of the RT and DR filters can help to overcome these difficulties. Using the RT and DR filters can make MPC tuning more intuitive and reduce commissioning time significantly, which helps to increase acceptance by end users. Also, each performance ratio has its own physical meaning, and the DR performance ratio can also help to adjust the robustness of the MPC control system. The RT and DR filters can therefore by fully decoupled, which provides an explicit two degrees of freedom property.

Figure 1:
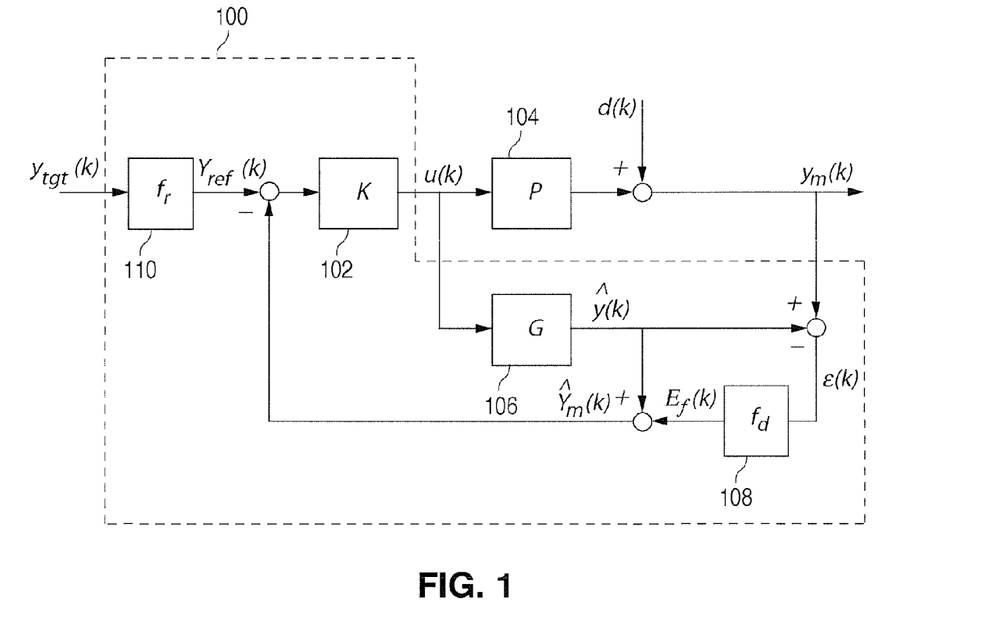
FIGS. 1 through 3 illustrate an example two-degrees of freedom (2DOF) control system using a model predictive control (MPC) system according to this disclosure.
Figure 2:
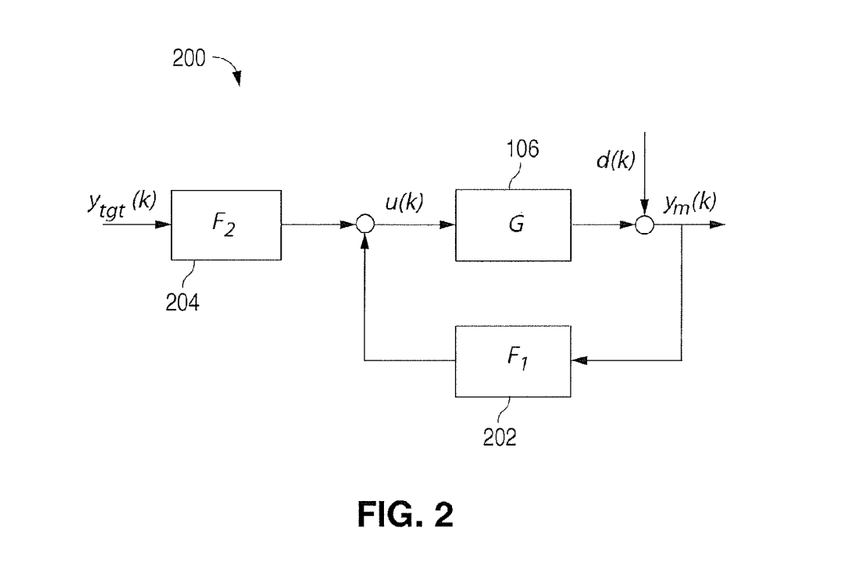
Figure 3:
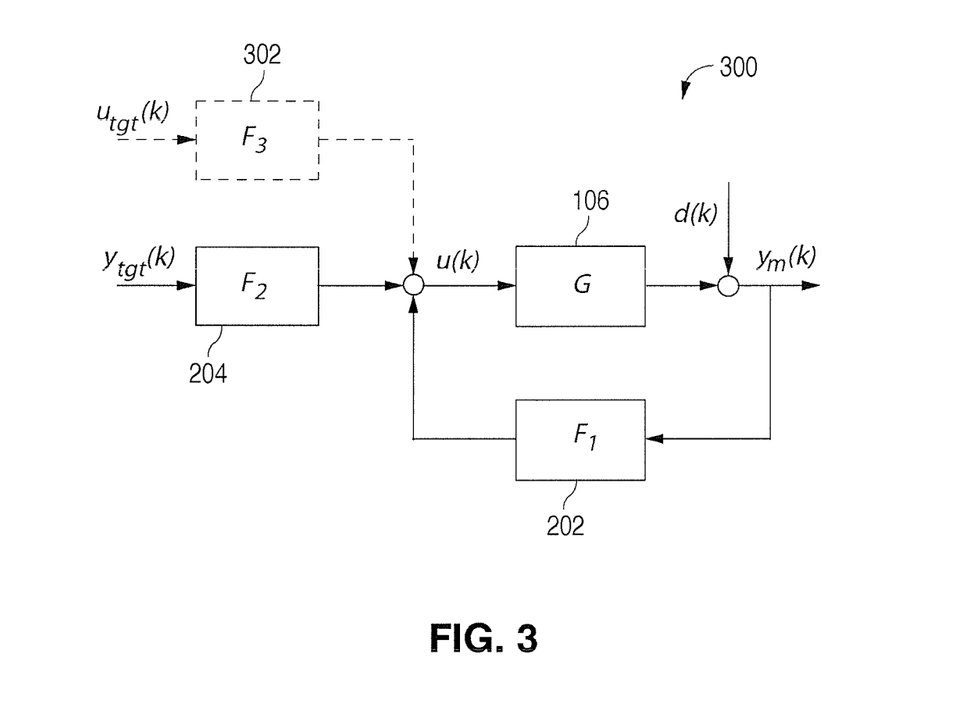

FIGS. 1 through 3 illustrate an example 2DOF control system 100 using an MPC system according to this disclosure. The 2DOF control system 100 can be implemented in any suitable device or system and can be used to control any suitable industrial or other process.

As shown in FIG. 1, the 2DOF control system 100 includes an MPC controller (K) 102, which is used to control an industrial process (P) 104. The controller 102 outputs a control signal u(k), which is provided to at least one actuator or regulatory controller in order to modify the industrial process 104. The control signal u(k) is also provided to a model 106. The model 106 is used as a mathematical approximation of the behavior of the process 104. The model 106 could be obtained or generated in any suitable manner, such as by using any suitable system identification utility.

The variable d(k) represents one or more output disturbances, and ϵ(k) represents an estimation of unmeasurable output disturbances. The unmeasurable output disturbances can sum up all sources of internal and external model uncertainties, such as output disturbances, model parametric uncertainties, sensor noise, and nonlinearities. Measurements of an output of the industrial process 104 are denoted $y_m(k)$. These measurements $y_m(k)$ can be obtained by one or more sensors.

The model 106 is used to generate a model output estimate ŷ(k) of the industrial process 104. The estimate ŷ(k) is compared to an actual measurement $y_m(k)$ to generate the estimated unmeasurable disturbance E(k), which represents a difference between the two values. The ŷ(k) and ϵ(k) values are used to generate an estimated output prediction vector Ŷ(k). The estimated output prediction vector Ŷ(k) functions as feedback and is compared with a reference trajectory $Y_{ref}(k)$. The difference between those values is used by the controller 102 to control the industrial process 104.

In this example, two filters 108-110 are used to convert the MPC controller 102 into a 2DOF control system. The first filter 108 represents a disturbance rejection filter, which filters the unmeasurable disturbance ϵ(k) to generate a predicted output disturbance trajectory $E_f(k)$. As a result, the disturbance rejection filter 108 controls the speed at which the control system 100 responds to output disturbances d(k) in the output measurements $y_m(k)$.

A user can tune the bandwidth of the disturbance rejection filter 108 through the value of the DR performance ratio, which as noted above defines the ratio between the desired closed-loop disturbance rejecting response time and the process open-loop response time of the control system 100. By allowing a user to simply define the DR performance ratio and then configuring the filter 108 based on the DR performance ratio, the user is able to quickly and easily adjust the aggressiveness and robustness of the control system 100 in responding to disturbances. The disturbance rejection filter 108 represents any suitable filter capable of filtering disturbance values, such as a low-pass filter.

The second filter 110 represents a reference tracking filter, which filters an output target $y_{tgt}(k)$. The output target $y_{tgt}(k)$ represents the desired value of the process output $y_m(k)$. When filtered by the filter 110, the output target $y_{tgt}(k)$ defines the reference trajectory $Y_{ref}(k)$, which is a vector and represents the trajectory that a predicted output Y(k) should follow during an MPC prediction period (one MPC iteration). As a result, the reference tracking filter 110 controls the speed at which the control system 100 responds to changes in an output target.

A user can tune the bandwidth of the reference tracking filter 110 through the value of the RT performance ratio, which as noted above defines the ratio between the desired closed-loop reference tracking response time and the process open-loop response time of the control system 100. By allowing a user to simply define the RT performance ratio and then configuring the filter 110 based on the RT performance ratio, the user is able to quickly and easily adjust the generation of output reference trajectories in the MPC controller's objective function. The reference tracking filter 110 represents any suitable filter capable of filtering setpoint or reference values, such as a low-pass filter.

Note that in FIG. 1, the two filters 108-110 are used to support the control of a single process output $y_m(k)$ based on the manipulation of a single manipulated variable using the control signal u(k). The two filters 108-110 can be replicated in any number of channels to support the control of any number of process outputs using any number of MVs/control signals.

The following discussion provides a basis for mathematically converting an MPC control system into an explicit 2DOF control system. The mathematical basis provided below is for illustration only and does not limit the scope of this disclosure.

The process 104 to be controlled can be represented by an augmented state-space model (model 106), such as:

$$\begin{bmatrix} \Delta x(k+1) \\ Cx(k+1) \end{bmatrix} = \begin{bmatrix} A & 0 \\ CA & 1 \end{bmatrix} \begin{bmatrix} \Delta x(k) \\ Cx(k) \end{bmatrix} + \begin{bmatrix} B \\ CB \end{bmatrix} \Delta u(k) \quad (1)$$

$$y(k) = \begin{bmatrix} 0 & 1 \end{bmatrix} \begin{bmatrix} \Delta x(k) \\ Cx(k) \end{bmatrix} + d(k)$$

where (A, B, C) is a state-space realization of the model 106 with appropriate dimensions. By defining:

$$x_a(k) = \begin{bmatrix} \Delta x(k) \\ Cx(k) \end{bmatrix}, \quad (2)$$

$$A_a = \begin{bmatrix} A & 0 \\ CA & 1 \end{bmatrix},$$

$$B_a = \begin{bmatrix} B \\ CB \end{bmatrix},$$

$$C_a = [0 \quad 1]$$

the state-space model in Equation (1) can be recast as:

$$x_a(k+1) = A_a x_a(k) + B_a \Delta u(k)$$

$$y(k) = C_a x_a(k) + d(k) \quad (3)$$

The model in Equation (3) can be used by the MPC controller 102 for state/output prediction.

To simplify analysis and without a loss of generality, any input time delay can be neglected in Equation (3). By connecting the state-space model ($A_a$, $B_a$, $C_a$) with a pure-delay state-space model ($A_d$, $B_d$, $C_d$) in series, input time delays can be incorporated into the states, and a process can be modeled similar to Equation (3). This can be accomplished using a state-space model $G_2$ in series with a pure-delay state-space model $G_1$, where:

$$G_1 = z^{-Td} \quad (4)$$

$$G_2: \begin{cases} x_a(k+1) = A_a x_a(k) + B_a \Delta u(k) \\ y(k) = C_a x_a(k) + d(k) \end{cases}$$

One drawback of using the model in Equation (3) for state/output prediction is that the output disturbance d(k) is not modeled. Rather, a constant future output disturbance d(k) is often assumed during state/output prediction in conventional MPC control. This design makes conventional MPC control very fragile. For example, it has been shown that an MPC controller has to rely on MV move penalty weights (denoted $Q_2$) in order to guarantee closed-loop stability. However, if $Q_2$ is set to zero, the resulting MPC controller cannot tolerate even a one-step time delay model mismatch in the discrete time domain.

To deal with this problem, the process state-space model can be redesigned for prediction as follows:

$$\begin{cases} x_a(k+1) = A_a x_a(k) + B_a \Delta u(k) \\ x_d(k+1) = A_d x_d(k) + B_d d(k) \\ d(k+1) = d(k) \\ y(k) = C_a x_a(k) + x_d(k) \end{cases} \quad (5)$$

where:

$$A_d = \begin{bmatrix} a_{d,1} & \cdots & 0 \\ 0 & \ddots & \vdots \\ 0 & \cdots & a_{d,ny} \end{bmatrix},$$

$$B_d = \begin{bmatrix} b_{d,1} & \cdots & 0 \\ 0 & \ddots & \vdots \\ 0 & \cdots & ba_{d,ny} \end{bmatrix}$$

$$a_{d,i} = e^{-\frac{T_s}{T_{p,i} \lambda_{d,i}}} \quad (i = 1, \ldots, ny) \quad (6)$$

$$b_{d,i} = 1 - a_{d,i}$$

The parameter $\lambda_d$, is the user-specified DR performance ratio for the $i^{th}$ output (meaning the ith process output $y_i(k)$). As described above, the DR performance ratio is one of the tuning parameters used to convert an MPC control system into a 2DOF control system. Also, $T_{p,i}$ is a gain-weighted output time constant for the $i^{th}$ output, and ny is the total number of controlled variables (CVs). The gain-weighted output time constant can be used to reflect the nature of a multiple-input multiple-output (MIMO) system, such as when an output loop is affected by multiple system inputs.

From Equation (5), a new state-space model can be expressed as:

$$\underline{x_a}(k+1) = \underline{A_a}\, \underline{x_a}(k) + \underline{B_a} \Delta u(k) \quad (7)$$

$$y(k) = \underline{C_a}\, \underline{x_a}(k)$$

where:

$$\underline{x_a}(k) = \begin{bmatrix} x_a(k) \\ x_d(k) \\ d(k) \end{bmatrix}, \quad (8)$$

$$\underline{A_a} = \begin{bmatrix} A_a & 0 & 0 \\ 0 & A_d & B_d \\ 0 & 0 & I \end{bmatrix},$$

$$\underline{B_a} = \begin{bmatrix} B_a \\ 0 \\ 0 \end{bmatrix},$$

$$\underline{C_a} = [C_a \quad I \quad 0]$$

The model in Equation (7) is used for state/output prediction in the following discussion.

It has been shown that an MPC problem can be formulated using standard constrained quadratic programming (QP). An example objective function can be given by:

$$J = \Delta U^T(k) H \Delta U(k) + 2\phi^T \Delta U(k) \quad (9)$$

where $\Delta U(k)$ represents predicted MV moves within a control horizon $H_u$. $\Delta U(k)$ can be represented by:

$$U(k) = \begin{bmatrix} u(k|k) \\ u(k+1|k) \\ \vdots \\ u(k+H_u-1|k) \end{bmatrix}, \quad (10)$$

$$\Delta U(k) = U(k) - U(k-1)$$

The Hessian matrix H in Equation (9) can be calculated as:

$$H = P_{cu}^T Q_1 P_{cu} + Q_2 + S_f^T Q_3 S_f \quad (11)$$

where:

$$P_{cu} = \begin{bmatrix} \underline{C_a B_a} & 0 & \cdots & 0 \\ \underline{C_a A_a B_a} & \underline{C_a B_a} & \vdots & \vdots \\ \vdots & \vdots & \ddots & \vdots \\ \underline{C_a A_a^{H_p-1} B_a} & \underline{C_a A_a^{H_p-2} B_a} & \cdots & \underline{C_a A_a^{H_p-H_u} B_a} \end{bmatrix}, \quad (12)$$

$$S_f = \begin{bmatrix} I \\ I \\ \vdots \\ I \end{bmatrix},$$

Here, $Q_1$, $Q_2$, and $Q_3$ are weights for the output reference trajectory tracking penalty, the input move penalty, and the input reference trajectory penalty, respectively. Also, I is an identity matrix with an appropriate dimension. The gradient matrix $\varphi$ in Equation (9) can be calculated as:

$$\varphi = P_{cu}^T Q_1 P_{cx} \underline{x_a}(k) + S_f^T Q_3 S_p u(k-1) - P_{cu}^T Q_1 Y_{ref} - S_f^T Q_3 U_{ref} \quad (13)$$

where:

$$P_{cx} = \begin{bmatrix} C_a A_a \\ C_a A_a^2 \\ \vdots \\ C_a A_a^{H_p} \end{bmatrix}, S_p = \begin{bmatrix} I & 0 & \cdots & 0 \\ I & I & \cdots & \vdots \\ \vdots & \vdots & \ddots & \vdots \\ I & I & \cdots & I \end{bmatrix} \quad (14)$$

$Y_{ref}$ and $U_{ref}$ in Equation (13) represent the output reference trajectory and the input reference trajectory, respectively. $Y_{ref}$ can be derived from the reference tracking filter 110, and $U_{ref}$ can typically be defined by a user.

The closed-form solution to minimize the objective in Equation (9) with respect to $\Delta U(k)$ can be expressed as:

$$\Delta U(k) = -H^{-1}\varphi \quad (15)$$

$$= \underbrace{-H^{-1}P_{cu}^T Q_1 P_{cx} \underline{x_a}(k)}_{K_x} \underbrace{-H^{-1}S_f^T Q_e S_p u(k-1)}_{K_{u-1}} +$$

$$\underbrace{H^{-1}P_{cu}^T Q_1 Y_{ref}}_{K_{yt}} + \underbrace{H^{-1}S_f^T Q_3 U_{ref}}_{K_{xt}}$$

$$= K_x \underline{x_a}(k) + K_{u-1} u(k-1) + K_{yt} Y_{ref} + K_{xt} U_{ref}$$

The first MV move can be extracted from $\Delta U(k)$ as follows:

$$\Delta u(k) = \xi \Delta U(k) \quad (16)$$

$$= \xi K_x x(k) + \xi K_{u-1} u(k-1) + \xi K_{yt} Y_{ref} + \xi K_{xt} U_{ref}$$

The truncation matrix $\xi$ in Equation (16) can be given by:

$$\xi = [I, 0, \ldots, 0] \in R^{N_u \times (N_u \cdot H_u)} \quad (17)$$

where $N_u$ is the total number of MVs, and I is an identity matrix.

The value $\underline{x_a}(k)$ above is the process augmented state in Equation (8), which may not be fully measurable, although it may be needed for the controller's design. A state observer for the system in Equation (7) can be designed as:

$$\begin{cases} \hat{x}_a(k) = A_a \hat{x}_a(k-1) + B_a \Delta u(k-1) \\ \hat{x}_d(k) = A_d \hat{x}_d(k-1) + B_d \hat{d}(k-1) \\ \hat{d}(k) = y(k) - C_a \hat{x}_a(k|k-1) = y(k) - C_a A_a \hat{x}_a(k-1) - C_a B_a \Delta u(k-1) \end{cases} \quad (18)$$

Rearranging Equation (18) into matrix form provides the following:

$$\underbrace{\begin{bmatrix} \hat{x}_a(k) \\ \hat{x}_d(k) \\ \hat{d}(k) \end{bmatrix}}_{\hat{x}_a(k)} = \quad (19)$$

$$\underbrace{\begin{bmatrix} A_a & 0 & 0 \\ 0 & A_d & B_d \\ -C_a A_a & 0 & 0 \end{bmatrix}}_{\underline{A}_a} \underbrace{\begin{bmatrix} \hat{x}_a(k-1) \\ \hat{x}_d(k-1) \\ \hat{d}(k-1) \end{bmatrix}}_{\hat{x}_a(k-1)} + \underbrace{\begin{bmatrix} B_a \\ 0 \\ -C_a B_a \end{bmatrix}}_{\underline{B}_a} \Delta u(k-1) + \underbrace{\begin{bmatrix} 0 \\ 0 \\ 1 \end{bmatrix}}_{L} y(k)$$

From Equation (19), the estimation of $\underline{x}_a(k)$ in Equation (15) can be derived from the current MV move $\Delta u(k)$ and the current output $y(k)$ as follows:

$$\underline{x}_a(k) = \Gamma(z) y(k) + \Theta(z) \Delta u(k) \quad (20)$$

where:

$$\Gamma(z) = z(zI - \underline{A}_a)^{-1} L, \Theta(z) = (zI - \underline{A}_a)^{-1} \underline{B}_a \quad (21)$$

Replacing $\underline{x}_a$ with $\underline{x}_a(k)$ from Equation (20) and inserting the result into Equation (15) yields the following:

$$\Delta u(k) = \xi K_x \Gamma(z) y(k) + \xi K_x \Theta(z) \Delta u(k) + \xi K_{u-1} u(k-1) + \xi K_{yt} Y_{ref} + \xi K_{xt} U_{ref} \quad (22)$$

By multiplying both sides of Equation (22) by $$\frac{z}{z-1}$$

(an integrator), the optimal input $u(k)$ can be derived as follows:

$$u(k) = \frac{z}{z-1} \xi K_x \Gamma(z) y(k) + \xi K_x \Theta(z) u(k) + \quad (23)$$

$$\frac{1}{z-1} \xi K_{u-1} u(k) + \frac{z}{z-1} \xi K_{yt} Y_{ref} + \frac{z}{z-1} \xi K_{xt} U_{ref}$$

By rearranging Equation (23), one can express in closed-form the optimal input $u(k)$, obtained from the minimizing argument of Equation (9), as:

$$u(k) = z[(z-1)I - (z-1)\xi K_x \Theta(z) - \xi K_{u-1}]^{-1} \xi K_x \Gamma(z) y(k) + z[(z-1)I - (z-1)\xi K_x \Theta(z) - \xi K_{u-1}]^{-1} \xi K_{yt} Y_{ref} + z[(z-1)I - (z-1)\xi K_{u-1}]^{-1} \xi K_{xt} U_{ref} \quad (24)$$

Based on the model realization in Equation (5) and the state observer design in Equation (18), the entire MPC control system can be illustrated as shown in FIG. 1. In FIG. 1, the model $f_d$ of the filter 108 can be given by:

$$f_{d,i} = \frac{b_{d,i} z^{-1}}{1 - a_{d,i} z^{-1}} z^{-T_d}, \left( a_{d,i} = e^{-\frac{T_s}{T_{p,i} \lambda_{d,i}}}, b_{d,i} = 1 - a_{d,i} \right) \quad (25)$$

$$f_d = \text{diag}(f_{d,1}, \ldots, f_{d,i}, \ldots, f_{d,n}) \text{ (for } i = 1, \ldots, ny)$$

Similarly, the model $f_r$ of the filter 110 can be given by:

$$f_{r,i} = \frac{b_{r,i} z^{-1}}{1 - a_{r,i} z^{-1}} z^{-T_d}, \left( a_{r,i} = e^{-\frac{T_s}{T_{p,i} \lambda_i}}, b_{r,i} = 1 - a_{r,i} \right) \quad (26)$$

$$f_r = \text{diag}(f_{r,1}, \ldots, f_{r,i}, \ldots, f_{r,n}) \text{ (for } i = 1, \ldots, ny)$$

The filter models in Equations (25) and (26) can be integrated into the overall prediction model in Equation (5).

The use of the filters 108-110 effectively converts an MPC control system into an explicit 2DOF control system as shown in FIG. 2, where a representation 200 denotes the closed-form of the MPC control system. As shown here, the filters 108-110 are represented by two functions 202-204. The function 202 operates on the process output measurement $y_m(k)$, while the function 204 operates on the output target $y_{tgt}(k)$.

Without a loss of generality, in FIG. 2 the representation 200 ignores an MV target input $u_{tgt}(k)$, which represents a desired move of an MV. The MV target input $u_{tgt}(k)$ can be expressly incorporated as shown in FIG. 3, where a representation 300 includes the functions 202-204 and an additional function 302. The additional function 302 can represent an additional filter (such as a low-pass filter) that governs the aggressiveness of MV target tracking performed by the MPC controller 102. This converts the MPC control system into a three-degrees of freedom (3DOF) feedback control system. For simplicity, the phrases "two-degrees of freedom" and "2DOF" are construed to mean at least two degrees of freedom. Note that the function $F_3$ may not affect the closed-loop stability and reference tracking/disturbance rejecting performance of the control system 100. Moreover, a third tunable filter can be used to implement the function $F_3$ and replace a tuning parameter for MV target tracking (denoted $Q_3$).

From the expression of an MPC controller in Equation (24), an explicit expression of $F_1$ can be derived as follows:

$$F_1 = z[(z-1)I - (z-1)\xi K_x \theta(z) - \xi K_{u-1}]^{-1} \xi K_x \Gamma(z) \qquad (27)$$

With respect to deriving an explicit expression for $F_2$ (the transfer function from the target $y_{tgt}(k)$ to the controller input $u(k)$), a reference trajectory $y_{ref,i}$ of the $i^{th}$ output can be governed by a linear difference equation such as the following:

$$y_{ref,i}(k+1) = a_{r,i} y_{ref,i}(k) + b_{r,i} y_{tgt,i}(k - T_{d,i}) \qquad (28)$$

where:

$$a_{r,i} = e^{-\frac{T_s}{T_{p,i} \lambda_{r,i}}}, \quad b_{r,i} = 1 - a_{r,i} \qquad (29)$$

Here, $y_{tgt,i}(k)$ and $T_{d,i}$ are the output target and time delay, respectively, of the $i^{th}$ output channel. As with Equation (4), one can convert the system in Equation (28) into a time-delay free system by adding a pure delay unit in series with the non-delay component. Therefore, Equation (28) can be rewritten as:

$$\begin{cases} x_{ref,i}(k+1) = A_{dr,i} x_{ref,i}(k) + B_{dr,i} y_{tgt,i}(k) \\ y_{ref,i}(k+1) = C_{dr,i} x_{ref,i}(k) \end{cases} \qquad (30)$$

where $(A_{dr,i}, B_{dr,i}, C_{dr,i})$ is a state-space realization of the system in Equation (28), and $x_{ref,i}(k+1)$ is the augmented state of the reference tracking filter 110 in Equation (28).

The parameter $\lambda_{r,i}$ is the user-specified RT performance ratio for the $i^{th}$ output, and $T_{p,i}$ is the gain-weighted output time constant for the $i^{th}$ output. Based on Equation (28), a reference trajectory prediction with a length of a control horizon $H_p$ can be performed as follows:

$$\begin{bmatrix} x_{ref,i}(k+1) \\ \vdots \\ x_{ref,i}(k+H_p) \end{bmatrix} = \begin{bmatrix} A_{dr,i} \\ \vdots \\ A_{dr,i}^{H_p} \end{bmatrix} x_{ref,i}(k) + \qquad (31)$$

$$\begin{bmatrix} B_{dr,i} \\ \vdots \\ A_{dr,i}^{H_p-1} B_{dr,i} + A_{dr,i}^{H_p-2} B_{dr,i} + \ldots + A_{dr,i} \end{bmatrix} y_{tgt,i}(k)$$

From Equation (31), the states $x_{ref,i}(k)$ can be back-calculated from the output target $y_{ref,i}(k)$:

$$x_{ref,i}(k) = (zI - A_{dr,i})^{-1} B_{r,i} y_{tgt,i}(k) \qquad (32)$$

The predicted reference trajectory $Y_{ref,i}$ can therefore be calculated from Equations (31) and (32) as follows:

$$Y_{ref,i} \left\{ \begin{bmatrix} C_{dr,i} A_{dr,i} \\ \vdots \\ C_{dr,i} A_{dr,i}^{H_p} \end{bmatrix} (zI - A_{dr,i})^{-1} B_{dr,i} + \right. \qquad (33)$$

$$\left. \begin{bmatrix} C_{dr,i} B_{dr,i} \\ \vdots \\ C_{dr,i} B_{dr,i}^{H_p-1} B_{dr,i} + C_{dr,i} A_{dr,i}^{H_p-2} B_{dr,i} + \ldots + C_{dr,i} B_{dr,i} \end{bmatrix} \right\} y_{tgt,i}(k)$$

Augmenting the reference trajectory vector $Y_{ref,i}$ for all setpoints $y_{tgt,i}(k)$ and then deriving the expression for the overall reference trajectory vector $Y_{ref}$ in Equation (24) yields:

$$Y_{ref} = \underbrace{\begin{bmatrix} \Lambda_1 & 0 & 0 \\ 0 & \ddots & 0 \\ 0 & 0 & \Lambda_{ny} \end{bmatrix}}_{\Lambda(z)} \underbrace{\begin{bmatrix} y_{tgt,1}(k) \\ \vdots \\ y_{tgt,ny}(k) \end{bmatrix}}_{y_{tgt}(k)} \qquad (34)$$

By inserting Equation (34) into Equation (24), the explicit expression for the transfer function from the output target $y_{tgt}(k)$ to the input $u(k)$ can be expressed as:

$$F_2 = z[(z-1)I - (z-1)\xi K_x \theta(z) - \xi K_{u-1}]^{-1} \xi K_{yt} \Lambda(z) \qquad (35)$$

From Equations (27) and (35), the MPC control is explicitly converted into a 2DOF feedback control system as shown in FIG. 1.

Through the use of two filters 108-110, a user is able to easily tune the behavior of the control system 100. Moreover, using the two performance ratios, the reference tracking performance and the disturbance rejection performance of the control system 100 can be successfully decoupled. Both ratios have their own physical meanings, and it is very intuitive for a user to use them and tune the MPC controller 102. This potentially makes MPC more easily accepted by end users.

The control system 100 in general and the filters 108-110 specifically can be implemented in any suitable manner. In some embodiments, the various components of the control system 100 can be implemented using software and/or firmware instructions executed on one or more hardware platforms (such as a process controller). As a particular example, the control system 100 could be implemented using MATLAB code or other code. The code could be compiled into an executable and delivered to end users or compiled into a dynamic link library (DLL) and used by other programming languages (such as C, C++, JAVA, or LABVIEW).

Although FIGS. 1 through 3 illustrate one example of a 2DOF control system 100 using an MPC system, various changes may be made to FIGS. 1 through 3. For example, as noted above, the two filters 108-110 can be replicated any number of times to support operations involving other combinations of inputs and outputs.

Figure 4:
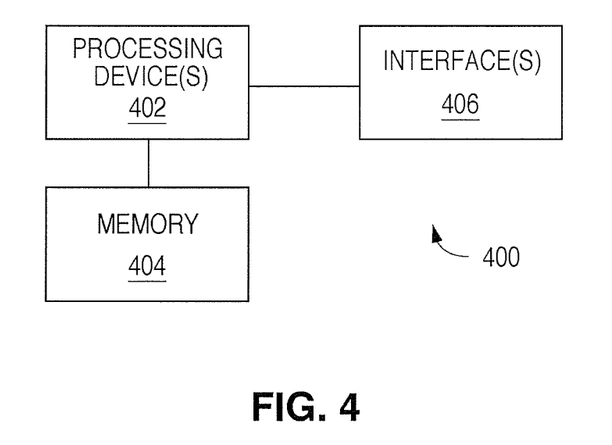
FIG. 4 illustrates an example implementation of a 2DOF control system supporting MPC control techniques according to this disclosure.

FIG. 4 illustrates an example implementation of a 2DOF control system supporting MPC control techniques according to this disclosure. In particular, FIG. 4 illustrates an example process controller 400 that can implement the MPC controller 102 and the filters 108-110 in FIG. 1.

As shown in FIG. 4, the controller 400 includes one or more processing devices 402, one or more memories 404, and one or more interfaces 406. The one or more processing devices 402 could execute software/firmware instructions for performing various operations related to MPC control of an industrial process. The one or more processing devices 402 could also execute software/firmware instructions for implementing the filters 108-110 shown in FIGS. 1 through 3 (and optionally a third filter as shown in FIG. 3) for each CV channel. The one or more processing devices 402 include any suitable computing or processing device(s). In particular embodiments, the one or more processing devices 402 include at least one microprocessor, microcontroller, digital signal processor, field programmable gate array, or application specific integrated circuit.

The one or more memories 404 are used to store instructions and data used, generated, or collected by the one or more processing devices 402. Each memory 404 includes any suitable structure for storing and retrieving information, such as a volatile or non-volatile memory.

The one or more interfaces 406 facilitate communication over a wired, wireless, or other network. For instance, the interface(s) 406 may allow the one or more processing devices 402 to receive output targets or other data and to provide control signals to actuators or regulatory controllers. Each interface 406 includes any suitable structure for sending or receiving data. Each interface 406 could, for example, include an Ethernet or other wired interface or a radio frequency (RF) or other wireless interface.

Although FIG. 4 illustrates one example implementation of a 2DOF control system supporting MPC control techniques, various changes may be made to FIG. 4. For example, any other suitable apparatus or system could be used to implement the filters for converting an MPC control system into a 2DOF control system.

FIGS. 5A through 6B illustrate example effects of different performance ratios in a 2DOF control system according to this disclosure. The examples shown here are for illustration only and do not limit the scope of this disclosure. To illustrate the fundamental concepts of this disclosure, a single-input single-output (SISO) system is used, although this disclosure is not limited to SISO systems.

Figure 5A:
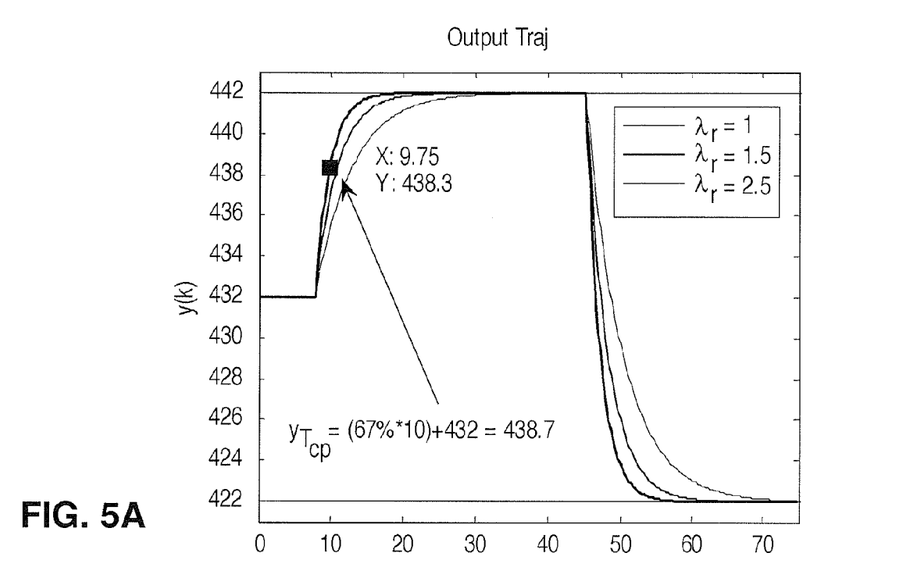
Figure 5B:
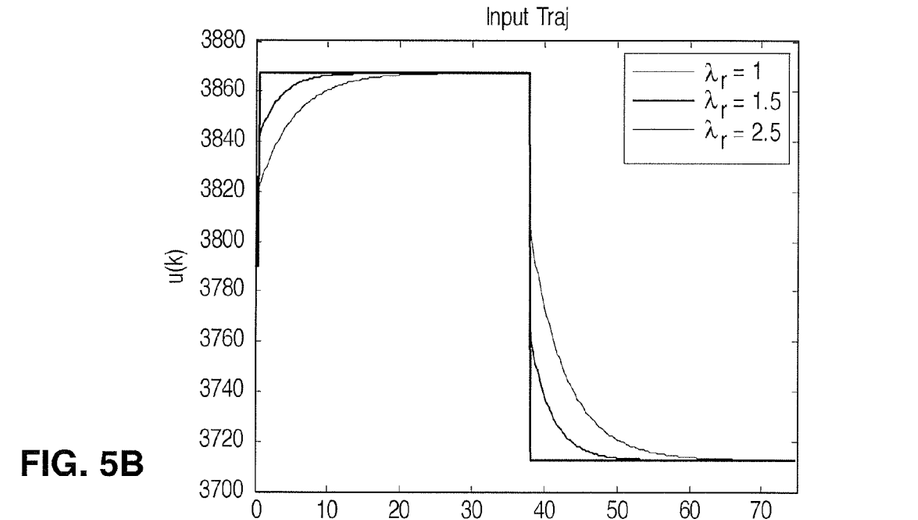

With respect to FIGS. 5A and 5B, consider a SISO system with a first-order plus dead time (FOPDT) transfer function model of:

$$G = \frac{0.129}{8T_s s + 1} e^{-30 T_s s} \tag{36}$$

The initial input and initial output are set to $u_0=3790$ and $y_0=432$, respectively, and the output target $y_{tgt}$ is first set to 442 and then switched to 422 after the system reaches a steady state. MPC weighting matrices are set to $Q_1=1$ and $Q_2=Q_3=0$, and the sampling rate $T_s$ is set to 15 seconds. Assume that there are no model errors between the actual process P and the controller model G in FIG. 1 (P=G).

The behavior of the 2DOF control system with respect to the reference trajectory of the single process output is shown in FIGS. 5A and 5B. As shown here, when the RT performance ratio $\lambda_r=1$, an MPC controller only needs one step move to reach steady-state (step response $T_{op}=T_{cp}$). When $\lambda_r=1.5$ or $\lambda_r=2.5$, the first moves are the largest, but a larger $\lambda_r$ value results in less aggressive control (meaning the first move when $\lambda_r=2.5$ is smaller than the first move when $\lambda_r=1.5$). The $\lambda_r$ value therefore has an effect on the actuator moves and can be used to tune the controller aggressiveness. Also, by calculating the rise time (the time it takes a first-order system's step response to reach 63% of its final value) of the closed loop response, it can be seen that the tuning parameter $\lambda_r$ has physical meaning, and it is very easy to understand by an end user.

Figure 6A:
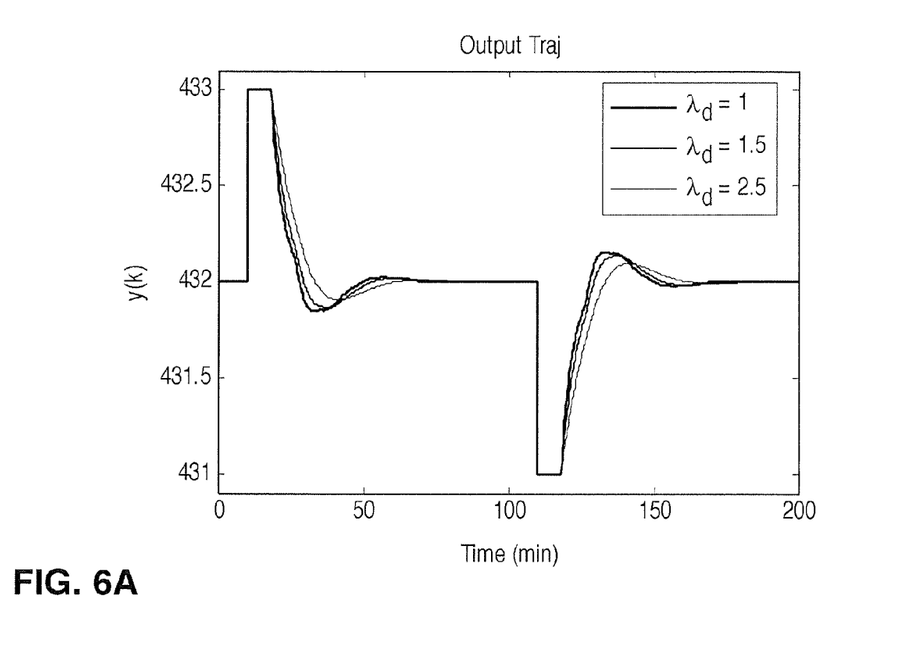
Figure 6B:
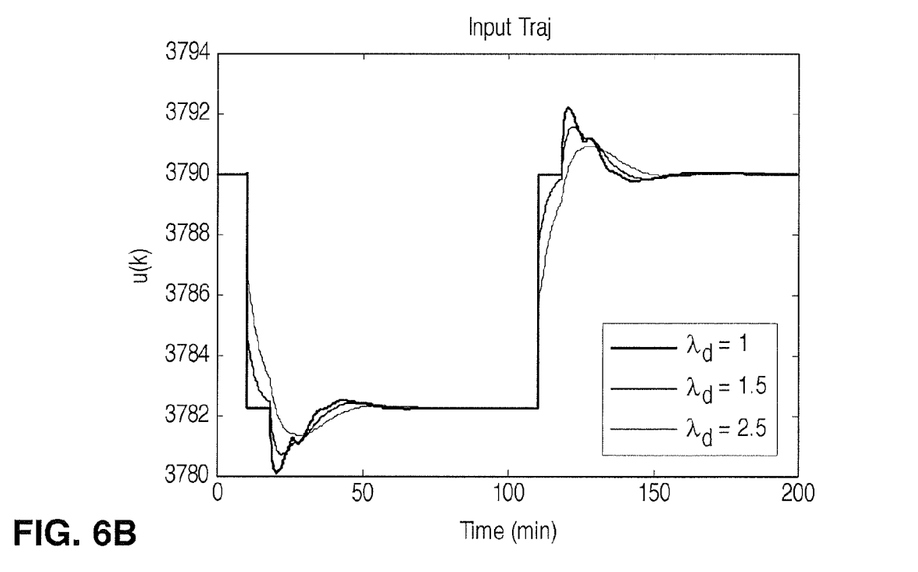

To evaluate the robustness and disturbance rejection properties of the resulting MPC controller, model mismatch and output disturbances can be added into the above example, and the test can be repeated. With respect to FIGS. 6A and 6B, the actual process is expressed as:

$$P = \frac{0.129 \times 2}{8T_s s + 1} e^{-(30+6)T_s} \tag{37}$$

and the controller model G is the same as in Equation (36) (meaning GOP). By comparing G in Equation (36) and P in Equation (37), it can be seen that there is a 100% process gain uncertainty and a 20% time delay uncertainty. The test uses the same initial input/output values, weighting matrices, and sampling rate as described above but keeps the output target the same as the initial $y_0$ (432). To test the disturbance rejection performance, constant output disturbances of ±1 (unmeasurable disturbances) are also added in this test.

The behavior of a 2DOF control system with respect to disturbance rejection is shown in FIGS. 6A and 6B. As shown here, a larger DR performance ratio $\lambda_d$ results in more conservative control, meaning the control system takes longer to recover from an output disturbance. However, when $\lambda_d$ is too small (such as $\lambda_d \leq 10.05$), this can lead to unstable feedback control. Thus, the value of $\lambda_d$ can be selected to achieve the desired robust margin of the resulting MPC closed-loop control system. The value of $\lambda_d$ therefore defines the recovering speed of a process from output disturbances. By calculating the recovery time (the time it takes a first-order system to recover 63% offset from a step output disturbance), it can be seen that $\lambda_d$ has physical meaning, and it is easy to understand by the end user.

As can be seen here, by using different values for $\lambda_r$ and $\lambda_d$, it is possible to design different recovery speeds for reference tracking and disturbance rejection. This provides two degrees of freedom feedback in the control system. As noted above, a third degree of freedom can be obtained by selecting a performance ratio for the third filtering function $F_3$. $\lambda_d$ does not significantly affect the recovery speed for reference tracking, and $\lambda_r$ does not significantly affect the recovery speed for disturbance rejection. Both closed-loop performances of an MPC controller are therefore explicitly decoupled.

Although FIGS. 5A through 6B illustrate examples of effects of different performance ratios in a 2DOF control system, various changes may be made to FIGS. 5A through 6B. For example, these figures are merely meant to illustrate some simulated effects that could be obtained using a particular implementation of a 2DOF control system. Other effects could be obtained using the same 2DOF control system or using different 2DOF control systems.

Figure 7:
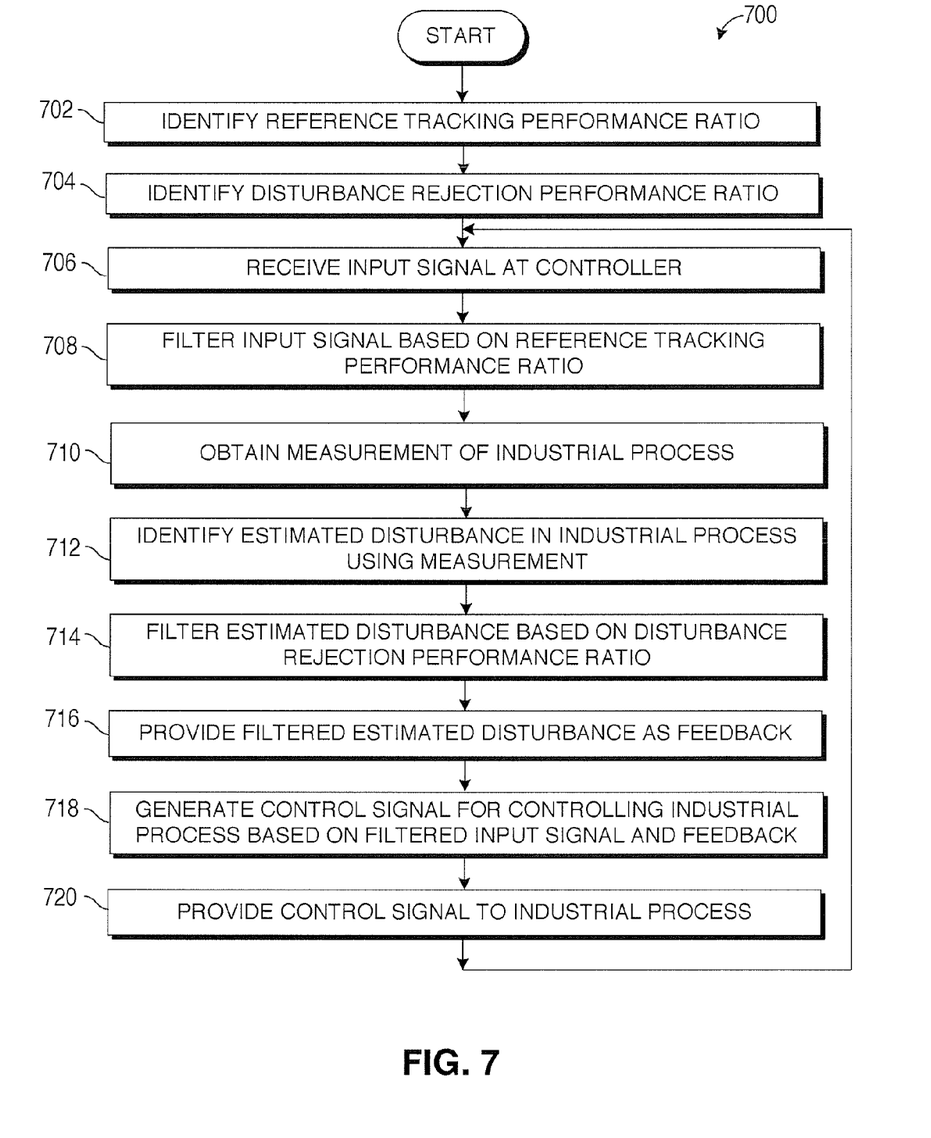
FIG. 7 illustrates an example method for converting an MPC system into a 2DOF control system according to this disclosure.

FIG. 7 illustrates an example method 700 for converting an MPC system into a 2DOF control system according to this disclosure. As shown in FIG. 7, a reference tracking performance ratio is identified at step 702, and a disturbance rejection performance ratio is identified at step 704. This could include, for example, the controller 400 obtaining these values from a user or from the memory 404.

An input signal is received at a controller at step 706. This could include, for example, the controller 400 receiving an output target $y_{tgt}(k)$ for a particular controlled variable in an industrial process. The output target is filtered based on the reference tracking performance ratio at step 708. This could include, for example, using the filter 110 (whose filtering function is based on the reference tracking performance ratio) to filter the output target $y_{tgt}(k)$ and generate a reference trajectory $Y_{ref}(k)$.

A measurement of an industrial process is obtained at step 710. This could include, for example, the controller 400 obtaining a measurement of a controlled variable in the process 104 from one or more sensors. An estimated disturbance in the industrial process is identified at step 712. This could include, for example, the controller 400 identifying a difference between the actual process output and an expected process output. The estimated disturbance is filtered based on the disturbance rejection performance ratio at step 714. This could include, for example, using the filter 108 (whose filtering function is based on the disturbance rejection performance ratio) to filter the estimated disturbance. The filtered estimated disturbance is provided as feedback at step 716.

A control signal for controlling the industrial process is generated at step 718 and provided to the industrial process at step 720. This could include, for example, the controller 102 generating the control signal u(k) based on the filtered input signal and the feedback.

Although FIG. 7 illustrates one example of a method 700 for converting an MPC system into a 2DOF control system, various changes may be made to FIG. 7. For example, while shown as a series of steps, various steps in FIG. 7 could overlap, occur in parallel, occur in a different order, or occur any number of times. As a particular example, steps 706-720 could all overlap, where the controller 400 is constantly receiving an output target $y_{tgt}(k)$, generating a control signal u(k), and receiving feedback $Y_m(k)$.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit" and "receive," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   obtaining a reference tracking performance ratio and a disturbance rejection performance ratio associated with a model predictive control (MPC) controller;
   filtering an output target signal for the MPC controller using a first filter based on the reference tracking performance ratio;
   filtering a feedback signal for the MPC controller using a second filter based on the disturbance rejection performance ratio; and
   providing the filtered signals to the MPC controller, the MPC controller configured to use the filtered signals to control an industrial process;
   wherein the reference tracking performance ratio defines a ratio between a desired closed-loop reference tracking response time of the MPC controller and an open-loop response time of the industrial process; and
   wherein the disturbance rejection performance ratio defines a ratio between a desired closed-loop disturbance rejecting response time of the MPC controller and the open-loop response time of the industrial process.

2. The method of claim 1, wherein the first and second filters provide two degrees of freedom for tuning reference tracking and disturbance rejection operations of the MPC controller.

3. The method of claim 2, wherein the reference tracking operation of the MPC controller and the disturbance rejection operation of the MPC controller are independently tunable.

4. The method of claim 1, further comprising:
   generating the feedback signal by identifying a difference between an actual output of the industrial process and an expected output of the industrial process.

5. The method of claim 4, wherein the difference between the actual and expected outputs includes all model uncertainties associated with the MPC controller and the industrial process.

6. The method of claim 1 wherein:
the reference tracking performance ratio controls how aggressively the MPC controller responds to a change in the output target signal; and
the disturbance rejection performance ratio controls how aggressively the MPC controller responds to a disturbance in the feedback signal.

7. An apparatus comprising:
at least one processing device configured to:
obtain a reference tracking performance ratio and a disturbance rejection performance ratio associated with a model predictive control (MPC) controller;
filter an output target signal for the MPC controller using a first filter based on the reference tracking performance ratio;
filter a feedback signal for the MPC controller using a second filter based on the disturbance rejection performance ratio; and
provide the filtered signals to the MPC controller, the MPC controller configured to use the filtered signals to control an industrial process;
wherein the reference tracking performance ratio defines a ratio between a desired closed-loop reference tracking response time of the MPC controller and an open-loop response time of the industrial process; and
wherein the disturbance rejection performance ratio defines a ratio between a desired closed-loop disturbance rejecting response time of the MPC controller and the open-loop response time of the industrial process.

8. The apparatus of claim 7, wherein the first and second filters are configured to provide two degrees of freedom for tuning reference tracking and disturbance rejection operations of the MPC controller.

9. The apparatus of claim 8, wherein the reference tracking operation of the MPC controller and the disturbance rejection operation of the MPC controller are independently tunable.

10. The apparatus of claim 7, wherein the at least one processing device is further configured to generate the feedback signal by identifying a difference between an actual output of the industrial process and an expected output of the industrial process.

11. The apparatus of claim 10, wherein the difference between the actual and expected outputs includes all unmeasurable disturbances associated with the MPC controller and the industrial process.

12. The apparatus of claim 7, wherein:
the reference tracking performance ratio controls how aggressively the MPC controller responds to a change in the output target signal; and
the disturbance rejection performance ratio controls how aggressively the MPC controller responds to a disturbance in the feedback signal.

13. The apparatus of claim 7, further comprising:
at least one memory configured to store the reference tracking performance ratio and the disturbance rejection performance ratio.

14. The apparatus of claim 7, further comprising:
at least one interface configured to receive the output target signal and to provide a control signal to an actuator or a regulatory controller in the industrial process.

15. A non-transitory computer readable medium embodying a computer program, the computer program comprising computer readable program code for:
filtering an output target signal for a model predictive control (MPC) controller using a first filter based on a reference tracking performance ratio;
filtering a feedback signal for the MPC controller using a second filter based on a disturbance rejection performance ratio; and
providing the filtered signals to the MPC controller, the MPC controller configured to use the filtered signals to control an industrial process;
wherein the reference tracking performance ratio defines a ratio between a desired closed-loop reference tracking response time of the MPC controller and an open-loop response time of the industrial process; and
wherein the disturbance rejection performance ratio defines a ratio between a desired closed-loop disturbance rejecting response time of the MPC controller and the open-loop response time of the industrial process.

16. The computer readable medium of claim 15, wherein:
the first and second filters are configured to provide two degrees of freedom for tuning reference tracking and disturbance rejection operations of the MPC controller; and
the reference tracking operation of the MPC controller and the disturbance rejection operation of the MPC controller are independently tunable.

17. The computer readable medium of claim 15, wherein:
the computer program further comprises computer readable program code for generating the feedback signal by identifying a difference between an actual output of industrial process and an expected output of the industrial process; and
the difference between the actual and expected outputs includes all unmeasurable disturbances associated with the MPC controller and the industrial process.

18. The computer readable medium of claim 15, wherein:
the reference tracking performance ratio controls how aggressively the MPC controller responds to a change in the output target signal; and
the disturbance rejection performance ratio controls how aggressively the MPC controller responds to a disturbance in the feedback signal.

19. The method of claim 1, further comprising:
generating at least one control signal for controlling the industrial process based on the filtered signals using the MPC controller; and
providing the at least one control signal to the industrial process.

20. The apparatus of claim 7, wherein the at least one processing device is configured to execute the MPC controller in order to:
generate at least one control signal for controlling the industrial process based on the filtered signals; and
provide the at least one control signal to the industrial process.

* * * * *